United States Patent [19]

Julius et al.

[11] 4,358,165

[45] Nov. 9, 1982

[54] HOLDING DEVICE FOR SUPPORTING A TURNABLE SHAFT

[75] Inventors: Volker Julius, Radevormwald; Paul Lienenlüke, Sprockhövel, both of Fed. Rep. of Germany

[73] Assignee: Vorwerk & Co. Interholding GmbH, Wuppertal, Fed. Rep. of Germany

[21] Appl. No.: 230,587

[22] Filed: Feb. 2, 1981

[30] Foreign Application Priority Data

Feb. 13, 1980 [DE] Fed. Rep. of Germany ... 8003736[U]

[51] Int. Cl.³ .................... F16C 17/12; F16C 35/02
[52] U.S. Cl. ......................................... 308/22; 308/15; 308/24
[58] Field of Search .............. 308/15, 22, 25, 24, 308/27, 34, 36, 37

[56] References Cited

U.S. PATENT DOCUMENTS

| | | | |
|---|---|---|---|
| 3,026,152 | 3/1962 | Liggio | 308/15 |
| 3,366,356 | 1/1968 | Fisher | 308/22 |
| 3,584,923 | 6/1971 | Goossens | 308/15 |
| 3,724,851 | 4/1973 | Cecchetti | 308/24 |
| 3,884,274 | 5/1975 | Sujdak | 308/24 |
| 3,994,542 | 11/1976 | Wojdyla | 308/22 |
| 4,255,493 | 3/1981 | Hauser | 308/27 |

FOREIGN PATENT DOCUMENTS

| | | | |
|---|---|---|---|
| 1808533 | 8/1969 | Fed. Rep. of Germany | 308/15 |
| 78579 | 6/1955 | Netherlands | 308/22 |

*Primary Examiner*—Richard R. Stearns
*Attorney, Agent, or Firm*—Michael J. Striker

[57] ABSTRACT

A holding device for supporting a turnable shaft in a housing of a domestic machine comprises a supporting member inserted into a recess provided in the housing of the machine. The supporting member includes a slotted ring-shaped portion which embraces the shaft in assembly and two elongated arms downwardly extended from the ring-shaped portion. The recess provided in the housing is in turn formed with a circular portion adapted to receive the ring-shaped portion of the supporting member and an elongated portion which serves to receive two arms of the supporting member. The supporting member is provided with two oppositely positioned hooks formed on the arms thereof which bear against undercuts formed in the recess of the housing. The housing is formed with an elastically yieldable portion which is pushed between the arms of the supporting member in assembly to clamp the supporting member and to thereby reliably arrest this member in the housing.

2 Claims, 1 Drawing Figure

U.S. Patent		Nov. 9, 1982		4,358,165
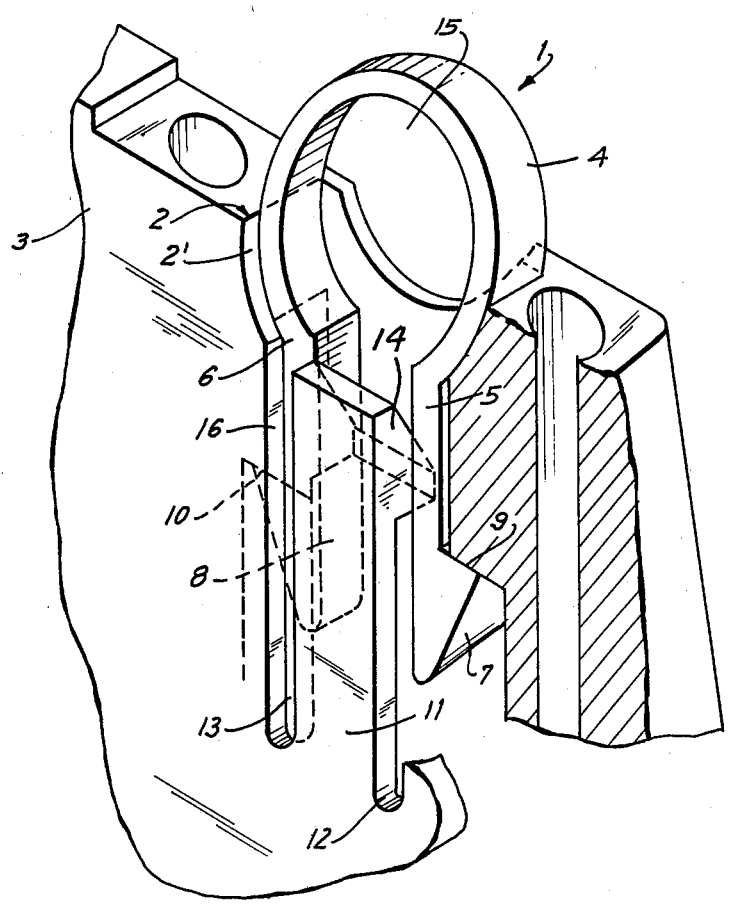

HOLDING DEVICE FOR SUPPORTING A TURNTABLE SHAFT

BACKGROUND OF THE INVENTION

This invention relates to a holding device for supporting a turnable shaft in a housing of a machine and, in particular, in a domestic machine.

Supporting devices for extremely slowly rotatable or turnable shafts or axles to be held in a housing of a machine are known in the art. In practice such shafts or axles are usually supported in the housing of the machine by means of brackets screwed to the housing of the machine, particularly to the housing of a domestic machine.

In such arrangements the shaft is so positioned within the bracket that a play is provided between them in order to facilitate the rotation of the shaft within the bracket. Normally, the shaft is supported at each end thereof by a bracket connected to the housing by two screws so that at least four screws or bolts are required to support the shaft in the machine housing. The known assembly has been found rather expensive.

Another disadvantage of such otherwise satisfactory arrangement resides in the possibilty of disengagement and subsequent loss of the screws from the brackets when certain additional vibrations occur in the domestic machine during its operation. In order to prevent such disengagement of the screws, certain additional means are required in the machine. Toothed washers or gluing were commonly utilized as such additional connecting means in the supporting devices for domestic machines.

SUMMARY OF THE INVENTION

It is an object of the invention to provide a supporting device for shafts to be supported in the housing of machines, which device avoids by simple means the aforementioned shortcomings encountered in the prior art.

Another object of the invention is to provide an improved supporting device which is easy to assemble and reliable in operation.

Still another object of the invention is to provide a supporting device which does not require additional connecting means to hold a rotary or turnable shaft within the housing.

Yet another object of the invention is to provide an improved supporting device for holding rotary or turnable shafts in the housing of a machine, which device prevents the shaft holding means from disengagement from the housing.

These and other objects of the invention are attained by a holding device for supporting a turnable shaft in the housing of a machine, particularly a domestic machine, comprising a supporting member adapted to embrace the shaft in assembly, the housing being formed with a recess, said supporting member being insertable into the recess and arrestable therein.

The device of the invention may further include means for arresting the supporting member in the recess formed in the housing.

The recess of the housing may be formed with a circular portion and an elongated portion, the circular portion merging into the elongated portion of the recess.

The supporting member according to the invention may be formed with a ring-shaped portion adapted to embrace the shaft and a pair of arms downwardly extended from the ring-shaped portion and inserted into the elongated portion of the recess in assembly.

The supporting member may further include a pair of hooks outwardly laterally extended from the arms and positioned at the ends of said arms. The elongated portion of the recess may have a pair of oppositely positioned undercuts, the hooks abutting against said undercuts upon insertion of the supporting member into the recess in the housing.

The aforementioned arresting means of the holding device may include an elastically yieldable means adapted to arrest the supporting member in the recess.

The housing of the machine may have a wall formed with two elongated slots spaced from one another to form an elastically yieldable portion therebetween which portion functions as the above-mentioned elastically yieldable means.

The elastically yieldable portion of the housing may be terminated with a nose, said nose being inserted between the arms of the supporting member to hold the supporting member in assembly after the aforementioned hooks have abutted the undercuts formed in the recess made in the housing.

The novel features which are considered as characteristic for the invention are set forth in particular in the appended claims. The invention itself, however, both as to its construction and its method of operation, together with additional objects and advantages thereof, will be best understood from the following description of preferred embodiments when read in connection with the accompanying drawing.

BRIEF DESCRIPTION OF THE DRAWING

The sole FIGURE of the drawing illustrates a perspective view, partially in section, of a holding device for supporting a turnable shaft in a housing of a machine according to the invention.

DESCRIPTION OF THE PREFERRED EMBODIMENT

As may be seen in the FIGURE of the drawing, a housing of a domestic machine denoted as 3 is partially shown in the drawing. The housing 3 is formed with a receiving recess 2 which has a circularly-shaped portion 2' and a downwardly extended elongated portion 16. A shaft-receiving supporting member 1 is inserted into the recess 2. The supporting member 1 is provided with a shaft-receiving portion 4, which has a substantially circular shape and is adapted to embrace a shaft (not illustrated herein) in assembly, and two downwardly extended arms 5 and 6 which project into the elongated portion 16 of the recess 2.

The arms 5 and 6 are provided at the lower ends thereof with hooks 7 and 8 which extend outwardly laterally from the arms 5 and 6. The recess 2 is formed with two oppositely positioned undercuts 9 and 10. After the supporting member 1 has been inserted into the recess 2, the hooks 7 and 8 bear against the undercuts 9 and 10 to thereby hold the supporting member 1 in its arresting position. The inner wall of the housing 3 is formed with two elongated slots 12 and 13 which are spaced apart to form an elastically yieldable 11 which extends outwardly toward the circular portion 2' of the receiving opening or recess 2. The elastically yieldable portion 11 is formed with a nose 14 which is pushed between two arms 5 and 6 to hold these arms in the arresting position. When the nose 14 is inserted between arms 5 and 6, the hooks 7 and 8 are unable to slip out from undercuts 9 and 10, whereby the reliable holding of the supporting member 1 within the housing is obtained.

When a shaft (not illustrated herein) is to be mounted in the housing 3, each of its ends is supported within one of the members 1. The same would hold true if a connecting nipple were provided having two stub shafts by means of which it could be mounted in two of the elements so that the nipple would be turned to two or more angularly displaced positions. Although such nipple is not illustrated herein, it is to be understood that shafts utilized in a domestic machine provided with the supporting device of the invention may be either rotatable or turnable to a certain angular position.

In assembling the arms 5 and 6 are directed into the receiving recess 2. In order to insert the arms 5 and 6 into the recess 2, these arms are pressed towards each other and inserted into the elongated portion 16 of the recess. The nose 14 is urged by the movement of the arms 5 and 6 in the outward direction. In the final resting position of the supporting member 1, the hooks 7 and 8 are expanded and move apart from each other to become positioned against the undercuts 9 and 10; and at the same time the nose 14 is snapped between the arms 5 and 6 holding the hooks 7 and 8 against the undercuts 9 and 10. It will be understood that the undesirable disengagement of the supporting element 1 with the housing 3 in such arrangement is totally prevented.

It will be understood that each of the elements described above, or two or more together, may also find a useful application in other types of holding devices for supporting a turnable shaft in a housing, differing from the types described above.

While the invention has been illustrated and described as embodied in a holding device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A holding device for supporting a turnable shaft in a housing of a machine, particularly a domestic machine, comprising a supporting member having a ring-shaped portion adapted to embrace the shaft and a pair of arms downwardly extended from said ring-shaped portion, said arms being formed with a pair of hooks, the housing being formed with a recess including a circular portion for partially receiving said ring-shaped portion and an elongated portion for receiving said arms in assembly, said elongated portion being formed with a pair of oppositely positioned undercuts, the housing further having two elongated slots spaced from one another to form an elastically yieldable portion therebetween, said elastically yieldable portion being terminated with a nose, said elastically yieldable portion being inserted between said arms so that said hooks abut against said undercuts and said nose is inserted between said arms whereby said supporting member is arrested in said recess.

2. The device of claim 1, wherein said hooks are outwardly laterally extended from said arms and positioned at the ends thereof.

* * * * *